United States Patent
Oowatari et al.

(10) Patent No.: US 7,605,511 B2
(45) Date of Patent: Oct. 20, 2009

(54) VEHICULAR ALTERNATOR AND METHOD OF PRODUCING THE SAME

(75) Inventors: Shinya Oowatari, Anjo (JP); Yoshiki Tan, Anjo (JP); Shinichi Matsubara, Anjo (JP); Masatoshi Koumura, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/882,833

(22) Filed: Aug. 6, 2007

(65) Prior Publication Data

US 2008/0048516 A1 Feb. 28, 2008

(30) Foreign Application Priority Data

Aug. 23, 2006 (JP) ............................ 2006-226614

(51) Int. Cl.
H02K 1/27 (2006.01)
H02K 1/28 (2006.01)
H02K 15/03 (2006.01)

(52) U.S. Cl. .................................. 310/156.72; 310/263
(58) Field of Classification Search ............ 310/156.66, 310/156.72, 263
See application file for complete search history.

(56) References Cited

U.S. PATENT DOCUMENTS

| | | | |
|---|---|---|---|
| 5,177,391 A | | 1/1993 | Kusase |
| 5,483,116 A | | 1/1996 | Kusase et al. |
| 5,793,144 A | | 8/1998 | Kusase et al. |
| 5,907,209 A | | 5/1999 | Ishida |
| 5,925,964 A | | 7/1999 | Kusase et al. |
| 5,969,459 A | | 10/1999 | Taniguchi et al. |
| 6,011,343 A | * | 1/2000 | Taniguchi ............... 310/263 |
| 6,013,968 A | * | 1/2000 | Lechner et al. ............. 310/263 |
| 6,111,390 A | | 8/2000 | Inaba et al. |
| 6,150,746 A | * | 11/2000 | Lechner ..................... 310/181 |
| 6,160,384 A | | 12/2000 | Inaba et al. |
| 6,311,383 B1 | | 11/2001 | Umeda et al. |
| 6,548,935 B1 | * | 4/2003 | Shendi et al. ............... 310/263 |
| 6,853,111 B2 | | 2/2005 | Umeda et al. |
| 6,853,112 B2 | * | 2/2005 | Nakamura et al. .......... 310/263 |
| 6,867,530 B2 | | 3/2005 | Gamm et al. |
| 6,924,580 B2 | | 8/2005 | Tajima et al. |
| 6,930,432 B2 | | 8/2005 | Maeda et al. |
| 2002/0117934 A1 | | 8/2002 | Kanazawa et al. |

(Continued)

FOREIGN PATENT DOCUMENTS

EP 1 643 615 A1 4/2006

(Continued)

Primary Examiner—Tran N Nguyen
(74) Attorney, Agent, or Firm—Oliff & Berridge, PLC (57) ABSTRACT

In a vehicular alternator having a permanent magnet protection mechanism, each magnet holder of a non-magnetic characteristic if a rectangle prism shape accommodates each permanent magnet disposed between adjacent claw poles. The magnet holders are connected in a ring shape along a circumferential direction of the alternator by using each connecting plate part which extends from each magnet holder in approximate circumferential direction toward an inner side of and at a front tip part of each claw pole. The connecting plate parts and the magnet holders are made from a non-magnetic plate by cutting and bending. Making the surfaces and the connecting plate part of each magnet holder from the non-magnetic plate by cutting and bending provides a high accuracy magnet position in the alternator with low manufacturing cost.

9 Claims, 6 Drawing Sheets

U.S. PATENT DOCUMENTS

| | | | |
|---|---|---|---|
| 2005/0184617 | A1 | 8/2005 | Fujita et al. |
| 2006/0290232 | A1 | 12/2006 | Fujita et al. |
| 2007/0046139 | A1 | 3/2007 | Ishizuka |
| 2007/0228866 | A1* | 10/2007 | Nakamura ................ 310/263 |

FOREIGN PATENT DOCUMENTS

| | | |
|---|---|---|
| JP | A 10-4660 | 1/1998 |
| JP | A 10-4662 | 1/1998 |
| JP | A 10-4663 | 1/1998 |
| JP | A 10-4664 | 1/1998 |
| JP | A 10-201149 | 7/1998 |
| JP | A 10-201150 | 7/1998 |
| JP | A-H10-271780 | 10/1998 |
| JP | A 11-127561 | 5/1999 |
| JP | A 11-191951 | 7/1999 |
| JP | A 11-215900 | 8/1999 |
| JP | A-H11-318066 | 11/1999 |
| JP | A 11-341762 | 12/1999 |
| JP | A 2002-262530 | 9/2002 |
| JP | A 2003-339141 | 11/2003 |
| JP | A 2004-007958 | 1/2004 |
| JP | A 2005-237107 | 9/2005 |
| JP | A 2006-109573 | 4/2006 |

* cited by examiner

FIG. 1

FRONT SIDE ←——→ REAR SIDE

VEHICULAR ALTERNATOR AND METHOD OF PRODUCING THE SAME

CROSS-REFERENCE TO RELATED APPLICATIONS

This application is related to and claims priority from Japanese Patent Application No. 2006-226614 filed on Aug. 23, 2006, the contents of which are hereby incorporated by reference.

BACKGROUND OF THE INVENTION

1. Field of the invention

The present invention relates to a vehicular alternator and a method of producing the vehicular alternator, in particular, relates to a vehicular alternator having a magnet protection mechanism capable of protecting permanent magnets disposed between claw poles, and a method of producing the vehicular alternator 2. Description of the Related Art As rotor of a vehicular alternator, there is a Lundell type rotor mechanism composed of odd-number claw poles and even number claw poles. Each of odd number claw poles is supported at one end part in an axial direction of the rotor and extending toward the axial direction. Each of an even number of claw poles is supported at another part and extends toward the axial direction. In the Lundell type rotor, the odd-number claw poles and the even number claw poles are alternately arranged in the circumferential direction of the rotor. Because the claw poles adjacent to each other in the circumferential direction are magnetized in opposite directions, a leakage magnetic flux between both the adjacent claw poles reduces the output of the vehicular alternator. In order to avoid the leakage magnetic flux generated between the claw poles, various types of a vehicular alternator using magnets are widely used. In such a vehicular alternator using magnets, a permanent magnet is placed between the claw poles adjacent to each other in the circumferential direction of the rotor.

However, centrifugal force of a large magnitude is generally applied to a flange of those permanent magnets during the rotation of the rotor. Because vibration force generated by applied force in the circumferential direction during/acceleration of the rotation of the rotor, by a strong magnetic field and by external vibration further applied to the permanent magnets, it is necessary to have a mechanism capable of efficiently fixing each permanent magnet to the corresponding claw poles in the rotor in order to avoid any displacement of each permanent magnet in the claw poles of the rotor. Permanent magnets are generally breakable and there is a demand of how to easily handle permanent magnets into the rotor during the assembling. In the techniques according to the related art, each permanent magnet is covered with a magnet holder made of non-magnetic material and each permanent magnet is adhered onto an inner surface of the magnet holder. In other words, fixing the permanent magnet to the claw pole actually means fixing each magnet holder to the corresponding claw pole.

Two related art documents, Japanese patent laid open publication No. JP H10-201150 and Japanese patent laid open publication No. JP-2006-109573, whose applicant is the same as the applicant of the present U.S. patent application according to the present invention, have disclosed a connection-type magnet holder mechanism for a rotor, where each magnet holder is connected by a plate shaped connecting member. The adaptation of such a plate-shaped connecting member to the magnet holders can effectively enhance the anti-vibration function for the permanent magnets in the rotor. Japanese patent laid open publication No. JP H10-201150 has further disclosed an elastic buffer mechanism in which a part of the magnet holder accommodating a permanent magnet faced to a claw pole is cut or bent. Japanese patent laid open publication No. JP 2006-109573 has further disclosed a mechanism in which thermosetting resin is impregnated into a gap between the magnet holder and the permanent magnet.

However, the connection-type magnet holder mechanism disclosed in JP H10-201150 requires a complicated manufacturing step because each holder of a rectangle prism shape or a box shape made of resin must be fixed to a connection part of a ring shape and the accuracy of an arrangement-position of the permanent magnet is decreased by a position error between the magnet holder and the connection part. In the related art technique JP H10-201150, the reliability of the strength of the connection is lost between the connection part and the magnet holder for accommodating the permanent magnet.

SUMMARY OF THE INVENTION

It is an object of the present invention to provide a vehicular alternator equipped with a permanent magnet and magnet holder of a connection-type magnet holder mechanism and to produce the vehicular alternator by simple manufacturing with low manufacturing cost. To achieve the above purpose, the present invention provides a vehicular alternator having a pair of pole cores, a field coil, permanent magnets, magnet holders, and connecting plate parts. The pair of pole cores has a plurality of claw poles of a specific number which extend an axial direction of the pole cores. The claw poles are alternately arranged in a circumferential direction of the pole cores at a specified pitch. The field coil is wound on a boss part of each pole core. The permanent magnets are arranged in a gap between adjacent claw poles in the circumferential direction in order to reduce magnetic leakage of the claw poles. The magnet holders have non-magnetic characteristic. Each magnet holder has a rectangular prism shape supported by the adjacent claw poles arranged in the circumferential direction. Each magnet holder accommodates and protects the permanent magnet by which the permanent magnet is supported between the adjacent two claw poles. Through the connecting plate parts, the magnet holders are connected in a ring shape. In particular, the magnet holders and the connecting plate parts are made from a single non-magnetic plate sheet by a cut and bend treatment.

According to the present invention, because a stainless steel plate of non-magnetic characteristic is cut and bent in order to form the magnet holders of a rectangle prism shape and the connecting plate parts in one assembled body, it is possible to eliminate the step of connecting or bonding the magnet holders and the connecting plate parts together, and it is thereby possible to enhance the reliability of the connection state between the magnet holders and the connecting plate parts. Further, on inserting the magnet holder accommodating the permanent magnet is inserted into a gap between the adjacent claw poles in the pole cores, it is possible to easily and accurately perform the positioning of the magnet holders at the claw poles.

In the vehicular alternator as another aspect of the present invention, each connecting plate part extends from a surface of each magnet holder in a radial direction of the pole cores. This configuration can achieve the simple and light cutting and bending process of forming the connecting plate parts. Because each connecting plate part connects a pair of the adjacent magnet holders through the inner surface of the claw pole in the radial direction, it is possible to bend the connecting plate part toward the radial side from the inner surface of the magnet holder in the radial direction.

In the vehicular alternator as another aspect of the present invention, the connecting plate part is disposed facing a front tip part of the claw pole in the radial direction. Because this configuration can reduce the length of each connecting plate part, it is possible to reduce the manufacturing cost including material cost. Further, this configuration can increase the area of surface parts (or referred to as "side surfaces") of each magnet holder which is formed by cutting and bending the part other than the surface (or referred to as "radius inner surface") of the magnet holder in the radius direction and extends along the surfaces of the permanent magnet.

In the vehicular alternator as another aspect of the present invention, the connecting plate part faces a base part of the claw pole in the radial direction. This configuration can also increase the area of the surface parts (or referred to as "side surfaces") of each magnet holder which is formed by cutting and bending the part other than the surface (or referred to as "radius inner surface") of the magnet holder in the radius direction and extends along the side surfaces of the permanent magnet.

In the vehicular alternator as another aspect of the present invention, the magnet holder has elastic projections capable of elastically projecting toward the side surfaces of the adjacent claw poles. Because the elastic projections are elastically compressed toward the circumferential direction when the claw pole is inserted into the pair of the magnet holders adjacent to each other in the circumferential direction, it is possible to assemble the claw poles and the magnet holders through a simple process and to provide a good mechanical connection between the claw poles and the magnet holders and further to reduce a dimensional tolerance during the assembling of the claw poles and the magnet holders.

In the vehicular alternator as another aspect of the present invention, each elastic projection is so formed that the surface of the magnet holder facing the claw pole is cut and bent. This configuration can save the amount of the non-magnetic plate efficiently during the manufacturing.

In the vehicular alternator as another aspect of the present invention, each elastic projection is composed of a base part and an extending part. The base part is a part of a side surface of each magnet holder facing the claw pole and positioned at the base part of the claw pole. The extending part extends from the base part along the side surface of the claw pole. An approximate intermediate part of the extending part is separated from the permanent magnet and bent toward the claw pole. This configuration can save the amount of the non-magnetic plate efficiently during the manufacturing. Further, it is possible to avoid the deformation of the elastic projections by contacting the front tip of the elastic projections having free ends to the front tips of the claw poles when the claw poles are inserted in the axial direction between the magnet holders.

In the vehicular alternator as another aspect of the present invention, five surfaces other than an inner surface of each magnet holder in the radius direction are made from the non-magnetic plate sheet by cutting and bending. This configuration can save the amount of the non-magnetic plate efficiently during the manufacturing.

In the vehicular alternator as another aspect of the present invention, the magnet holder accommodating the permanent magnet has a penetrating hole through which an outer surface of the permanent magnet in the radius direction is exposed through the penetrating hole. This configuration can pour the liquid resin into the magnet holder from the outer circumferential side of the rotor through one or more the penetrating holes in order to bond the permanent magnet to the magnet holder. Further, the remaining resin in the penetrating holes become resin projections and can prevent the deformation of the outer surfaces of the magnet holder toward the outside thereof.

In a method of producing a vehicular alternator as another aspect of the present invention, the vehicular alternator has pole cores, a field coil, permanent magnets, and magnet holders. The pole cores have a plurality of claw poles arranged in a circumferential direction of the pole cores. The field coil is wound on the pole cores. The permanent magnets are arranged in a gap between adjacent claw poles. The magnet holders have a non-magnetic characteristic accommodating the permanent magnet. Each magnet holder has a rectangular prism shape supported by the adjacent claw poles and has one or more penetrating holes through which an outer surface of the permanent magnet is exposed. Through the connecting plate parts, the magnet holders are connected in a ring shape. The method has steps of wounding the field coil on the pole cores, dropping liquid resin onto the field coil in order to coat the field coil with the resin, and dropping liquid resin into the gap between the permanent magnet and the magnet holder through the penetrating holes in order to integrate the permanent magnet and the magnet holder. It is thereby possible to perform a simple manufacturing step of bonding the permanent magnet to the magnet holder together.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Hereinafter, various embodiments of the present invention will be described with reference to the accompanying drawings. In the following description of the various embodiments, like reference characters or numerals designate like or equivalent component parts throughout the several diagrams.

Embodiment

A description will be given of a vehicular alternator according to an embodiment of the present invention with reference to FIG. 1 to FIG. 6.

Figure 1:
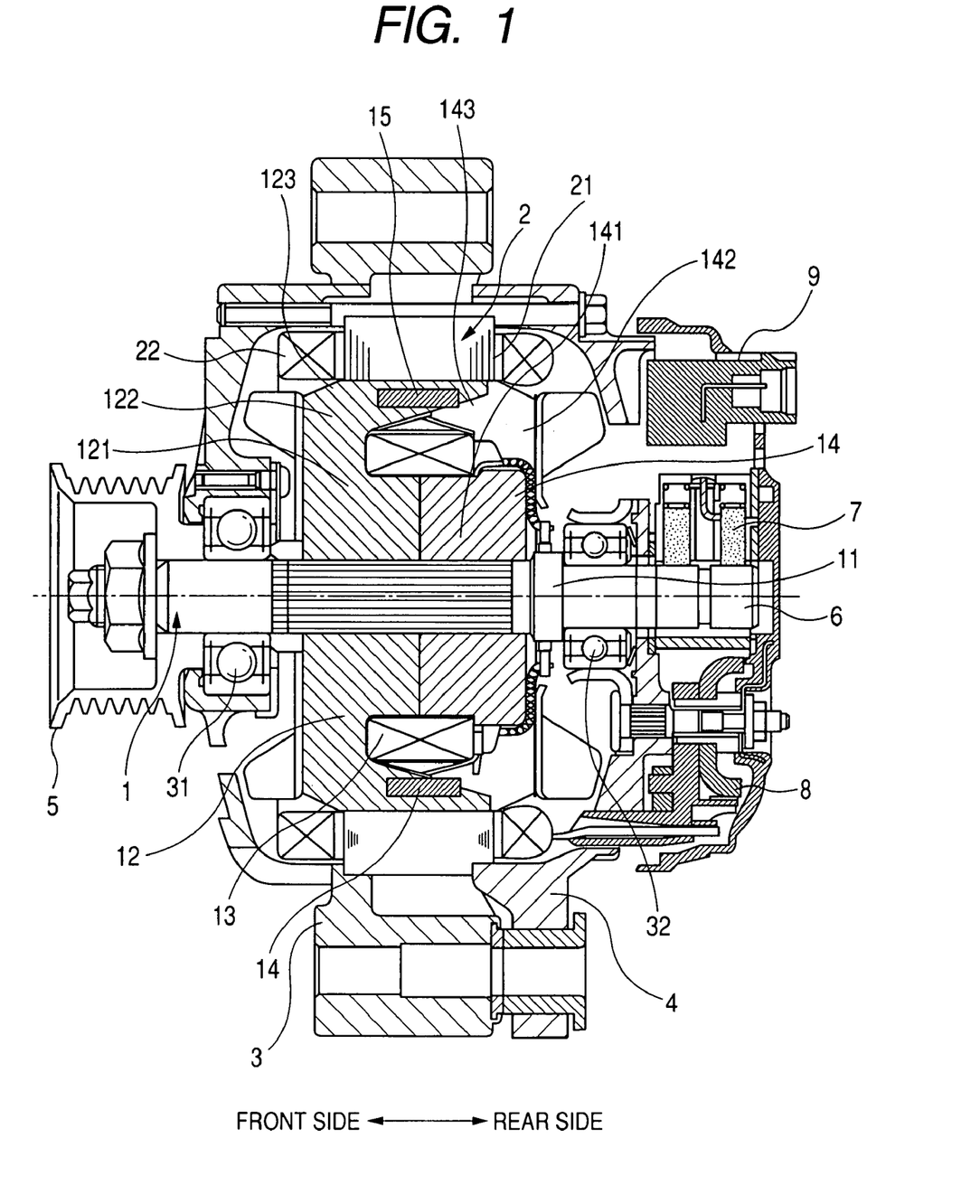
FIG. 1 is a sectional view of a vehicular alternator, along an axial direction thereof, equipped with a Lundell type rotor according to an embodiment of the present invention.

FIG. 1 is a sectional view of the vehicular alternator in an axial direction thereof according to an embodiment of the present invention. The vehicular alternator shown in FIG. 1 is equipped with a Lundell type rotor 1. As shown in FIG. 1, the vehicular alternator is mainly composed of the Lundell type rotor 1 (or the rotor 1 in short), a stator 2, a front frame 3, a rear frame 4, a pulley 5, a slip ring 6, a brush assembly 7, a rectifier 8, and a regulator 9.

The stator 2 has a stator coil 22 wound on a stator core 21 and fixed to the inner circumference surfaces of the front frame 3 and the rear frame 4. The front frame 3 and the rear frame 4 accommodate the stator 2 and are fastened to each other by bolts. Further, the front frame 3 and the rear frame 4 rotatably support a rotary shaft 11 of the rotor 1 through both bearings 31 and 32.

The rotor 1 is composed mainly of a front side pole core 12, a field coil 13 (hereinafter, referred also to as "exciting coil"), a rear side pole core 14, permanent magnets 15, and magnet holder 40 of a rectangle prism shape or a box shape made of non-magnetic material. Each magnet holder 40 accommodates each permanent magnet 15. The configuration and function of the magnet holders 40 will be explained later in detail. The pole cores 12 and 14 forms a pair having a same configuration. Those pole cores are well known as a Lundell type rotor core. In more detailed explanation, the pole core 12 has a boss part 121, a disk part 122, and plural claw poles 123. The disk part 122 extends in the radial direction of the rotor 1 from a front end part of the boss part 121 toward the outside. Each claw pole 123 extends in the axial direction of the rotor 1 from the disk part 122 toward the rear side of the vehicular alternator. Similarly, the pole core 14 has the same configuration of the pole core 12. That is, the pole core 14 has a boss part 141, a disk part 142, and plural claw poles 143. The disk part 142 extends in the radial direction of the rotor 1 from a front end part of the boss part 141 toward the outside. Each claw pole 143 extends in the axial direction of the rotor 1 from the disk part 142 toward the front side of the vehicular alternator. The rear end surface of the pole core 12 is faced to the front end surface of the pole core 14. The pole cores 12 and 14 accommodate the exciting coil 13. The disk parts 122 and 142 and the boss parts 121 and 141 are assembled with one body. Both the pole cores 12 and 14 are made of soft-magnetic material. In actual case, each of the disk parts 122 and 142 has concave and convex parts corresponding to eighth claw poles. That is, each of the disk parts 122 and 142 has total eight projection parts extending radially. As well known, the claw poles 123 of the pole core 12 and the claw poles 143 of the pole core 14 are alternately arranged in the circumferential direction of the rotor 1.

(Rotor Structure)

Figure 2:
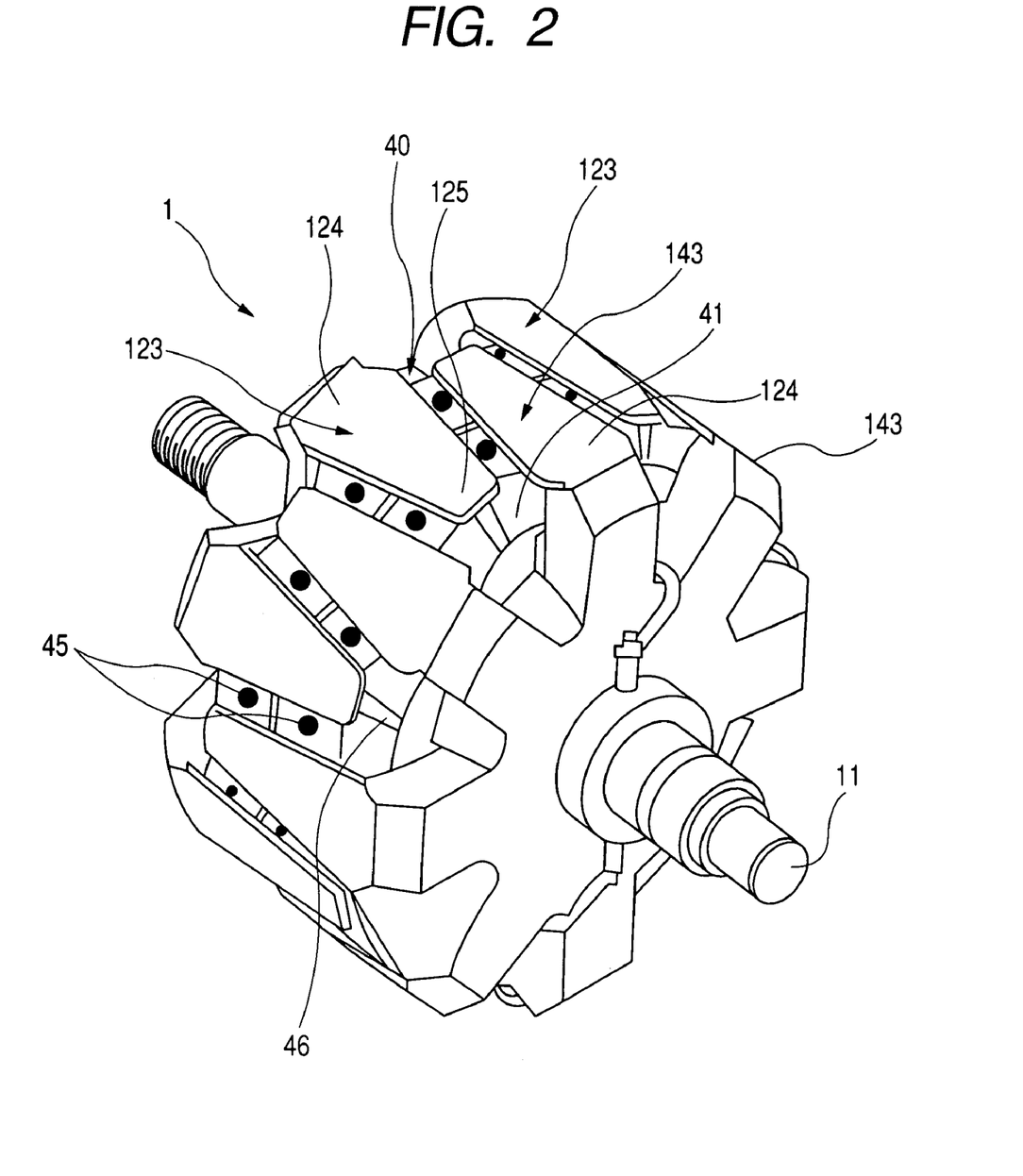
FIG. 2 is a perspective view of the Lundell type rotor with permanent magnets and magnet holder disposed between adjacent claw poles according to the embodiment shown in FIG. 1.
Figure 3:
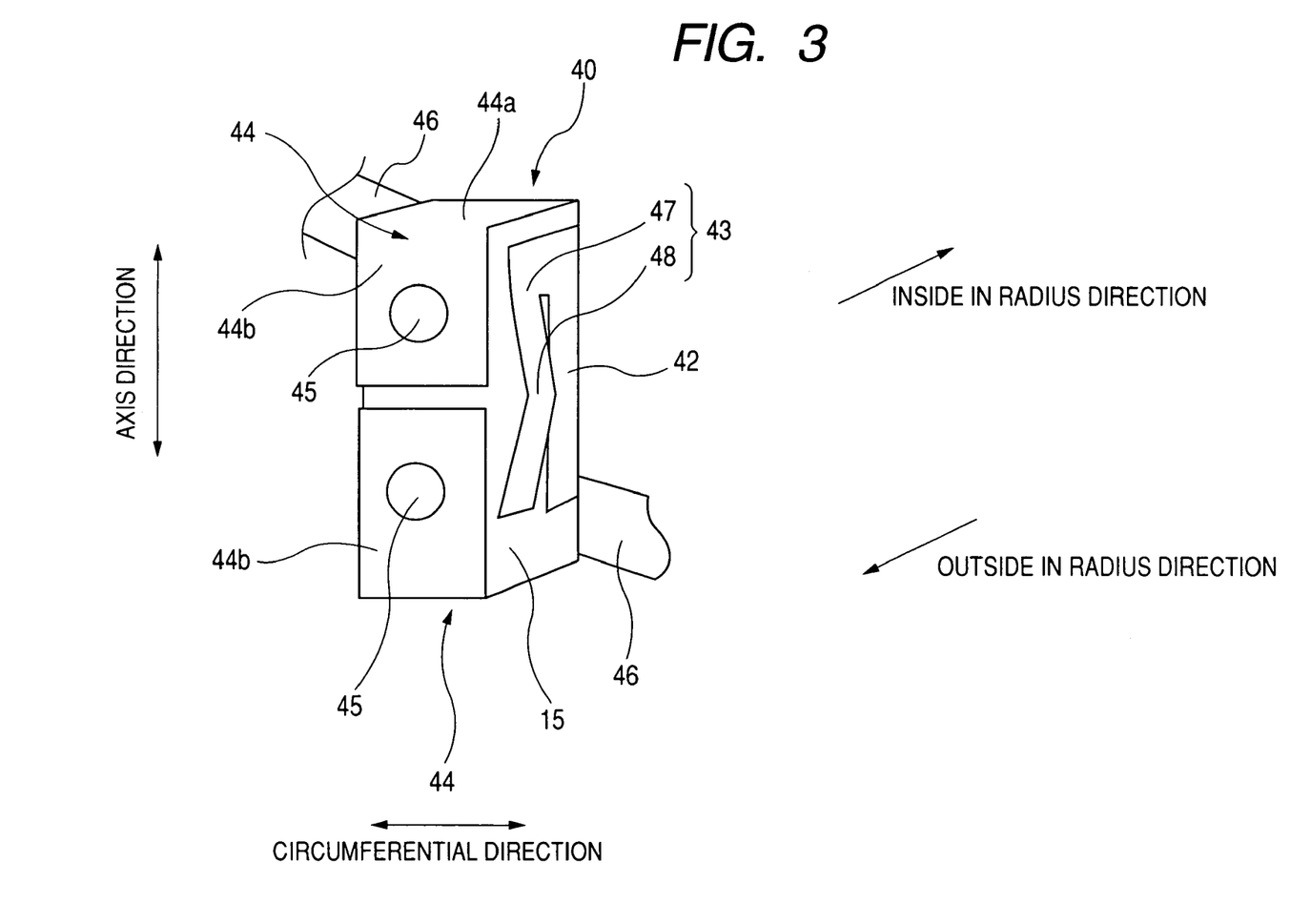
FIG. 3 is a perspective view of a pair of the permanent magnet and the magnet holder in the vehicular alternator of the embodiment shown in FIG. 1 and FIG. 2.

FIG. 2 is a perspective view of the Lundell type rotor 1 with the permanent magnets 15 and the magnet holder 40 disposed between adjacent claw poles according to the embodiment shown in FIG. 1. FIG. 3 is a perspective view of a pair of the permanent magnet 15 and the magnet holder 40 in the rotor 1 of the vehicular alternator of the embodiment shown in FIG. 1 and FIG. 2.

The magnet holder 40 is interposed in a gap formed between the claw pole 123 and the claw pole 143 which are adjacent to each other and disposed at a constant pitch along the circumferential direction. Each magnet holder 40 accommodates the corresponding permanent magnet 15 (which is omitted from FIG. 2 for brevity). Each permanent magnet 15 is so magnetized that both side surfaces thereof (which face the adjacent claw poles) become magnetic pole surfaces which are alternately magnetized in the circumferential direction. In particular, the magnetization of the side surfaces of the permanent magnet 15 is performed in the direction in order to increase the effective magnetic flux at the part between the claw pole and the stator 2. This configuration can increase a large amount of the field magnetic flux with a small field current. Because the configuration and effects of the pole core assembly with the permanent magnets are well known, the detailed explanation thereof is omitted here.

(Magnet Holder 40)

A description will now be given of the connecting plate part 46 which connects the adjacent magnet holders 40 in the Lundel type rotor 1 in the vehicular alternator shown in FIG. 1. The mechanism and feature of the connecting plate parts 46 as one of the features of the present invention will be explained with reference to FIG. 3 to FIG. 5.

Figure 4:
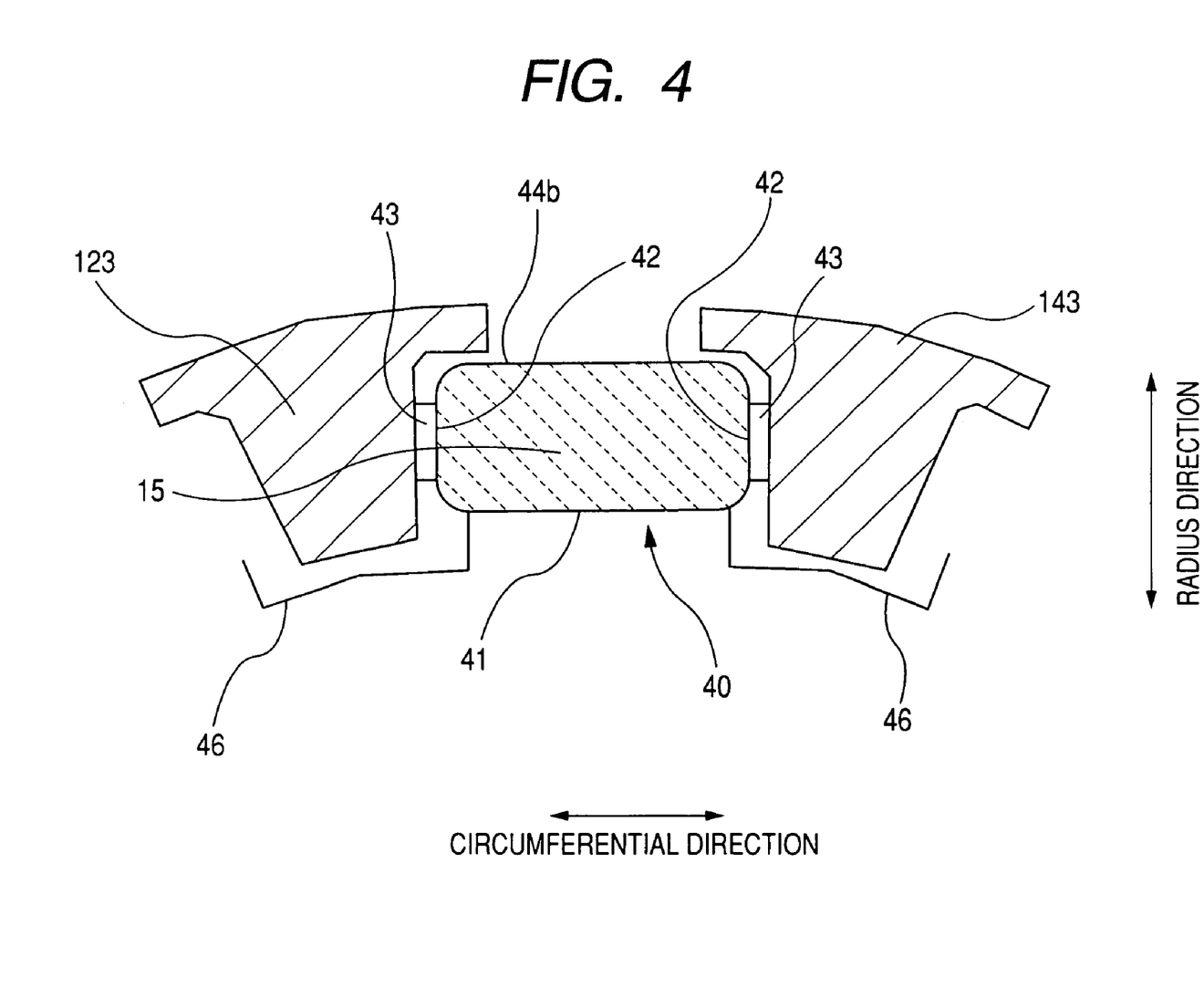
FIG. 4 is a sectional view of a part of the Lundell type rotor in a radius direction, in particular shows the magnet holder disposed the adjacent claw poles in the vehicular alternator shown in FIG. 1 and FIG. 2.
Figure 5:
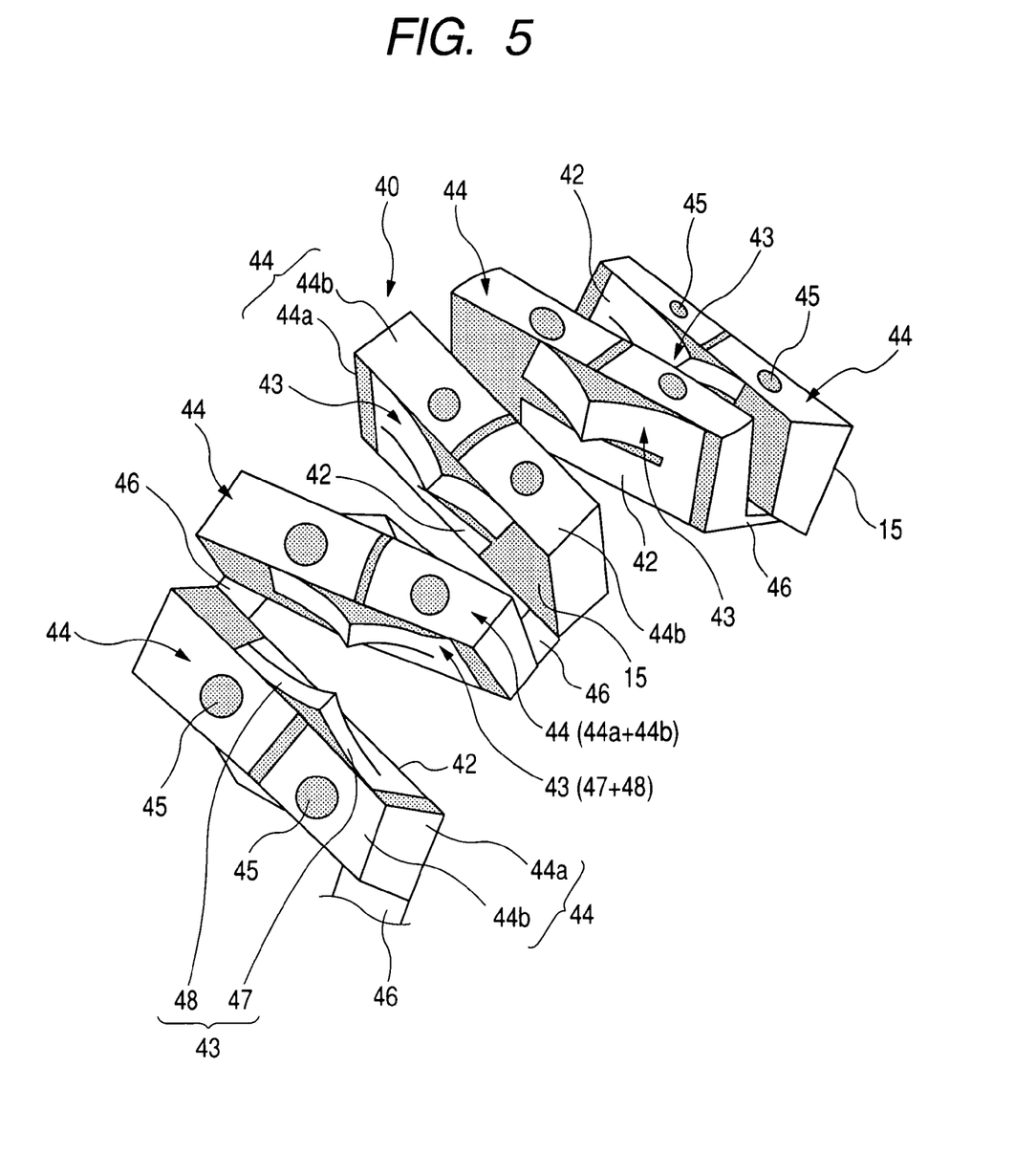
FIG. 5 is a perspective view of the permanent magnets and the magnet holders arranged in a circumferential direction of in the Lundell type rotor shown in FIG. 2.

FIG. 4 is a sectional view of a part of the Lundell type rotor in the radius direction thereof, in particular shows the magnet holder 40 disposed the adjacent claw poles 123 and 143 in the vehicular alternator shown in FIG. 1 and FIG. 2. FIG. 5 is a perspective view of the permanent magnets 15 and the magnet holders 40 arranged in a circumferential direction of in the Lundell type rotor shown in FIG. 2.

In FIG. 5, the surface of each permanent magnet 15 is designated by black color for easily understanding. The magnet holder 40 is formed in a rectangle prism shape or a square shape by bending non-magnetic stainless steel plate. The magnet holder 40 accommodates the permanent magnet 15.

The two magnet holders 40 adjacent to each other in the circumferential direction are connected by the connecting plate part 46. The connecting plate part 46 is made from non-magnetic stainless steel by cutting and bending simultaneously during the formation of the magnetic holder 40. That is, the connecting plate parts 46 and the magnet holders 40 are simultaneously formed from non-magnetic stainless plate by cutting and bending. This formation manner can be free from the connection process of connecting the connecting plate part 46 and the magnet holder 40. This manner thereby increases the accuracy in position of each magnet holder 40 and provides an easy manufacturing step.

Figure 6:
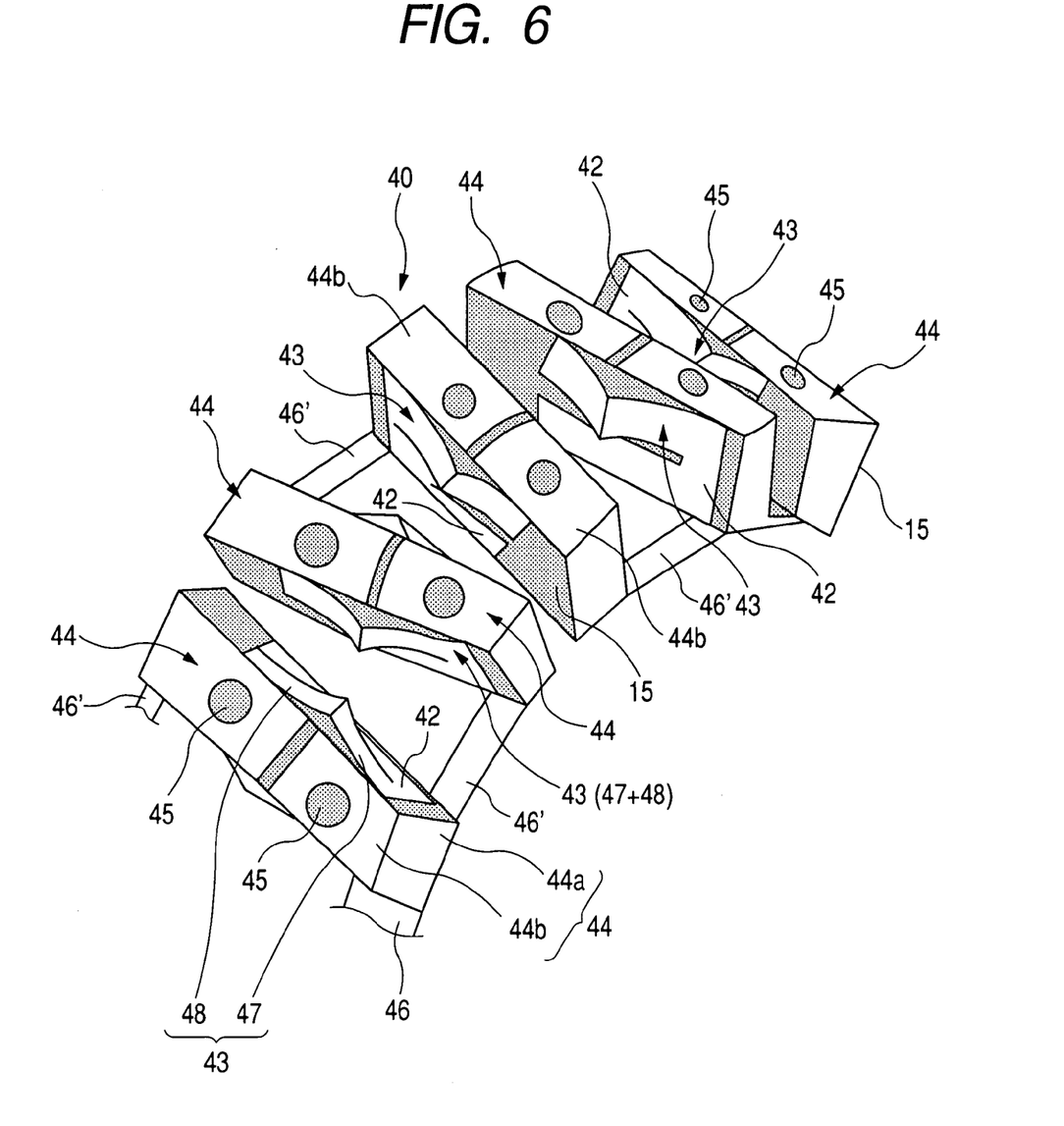
FIG. 6 is a perspective view of another configuration of the connecting plate parts of the magnet holders in the Lundell type rotor shown in FIG. 2.

As shown in FIG. 5, the connecting plate part 46 extends from a surface part 41 (or a radius inner surface part 41 in the radius direction) of the magnet holder 40 at the front tip side of each claw pole toward the both sides of the magnet holder 40. In FIG. 3, the radius inner surface 41 of the magnet holder 40 in the radius direction is hidden. As shown in FIG. 4, the connecting plate part 46 is arranged facing the font tip of the claw pole in the radius direction. The concept of the present invention is not limited by the above configuration. For example, as shown in FIG. 6, it is acceptable to dispose each connecting plate part 46' so facing the bottom part 124 (see FIG. 2) of the claw pole.

As shown in FIG. 4, a pair of side surface parts 42 of each magnet holder 40 faces the side surfaces of the claw poles 123 and 143. Each of the side surfaces 42 extends toward the outside of the magnet holder 40 in the radial direction (also see FIG. 3) along the side surface of the permanent magnet 15 from the part, where the connecting plate part 46 does not extend, in both the circumferential side edges of the radius inner surface part 41 of the magnet holder 40 which have been bent.

Further, the bending step forms elastic projections 43 extending toward the front tip side of each of the claw poles 123 and 143 from the base part thereof. FIG. 3 shows only one of the pair of the side parts 42 and one of the pair of the elastic projections 43 in each magnet holder 40. FIG. 3 does not show the other of the pair of the side parts 42 and the other of the pair of the elastic projections 43 of the magnet holder 40. That is, the elastic projections 43 are formed by bending the inner surface part of the magnet holder 40.

As shown in FIG. 4 and FIG. 5, each elastic projection 43 is composed of a base part 47 and an extending part 48. The base part 47 is formed by bending the radius inner part 41 of the magnet holder 40 at the bottom sides of the claw pole in the approximate radius direction. The extending part 48 extends from the base part 47 toward the front tip part of the claw pole along the side surface of the claw pole. The approximate intermediate part of the extending part 48 is bent toward the direction which is separated from the permanent magnet 15, namely toward the direction to the claw pole.

As shown in FIG. 3 and FIG. 5, a pair of L-shaped bending parts 44 of the magnet holder 40 firstly extends in the radius direction from both the side edges of the radius inner surfaces 41 of the magnet holder 40 toward the outside, and then extends in the axial direction so that those L-shaped bending parts 44 accommodate the permanent magnet 15.

Each L-shaped bending part 44 has a radius extending part 44a extending toward the radius direction and an axial extending part 44b. FIG. 3 does not show one of the radius extending parts 44a of the magnet holder 40. A penetrating hole 45 is formed at the intermediate part in each axial extending part 44b in the pair of the L-shaped bending parts 44.

The field coil 13 wound on a bobbin is fitted into the boss parts 121 and 141 of the pole cores 12 and 14, as shown in FIG. 1. After this, the magnet holders 40 are inserted from the bottom side of the claw poles in the axis direction. For example, epoxy resin is then dropped from the outer circumferential side and the upper side to the rotor 1 while rotating the rotor 1 in order to cover the rotor 1 with the epoxy resin. The field coil 13 and the rotor 1 are thereby assembled in one body and the magnet holder 40 and the permanent magnet 15 are simultaneously formed in one body by solidification of the epoxy resin. That is, the epoxy resin permeates the magnet holder 40 through the penetrating hole 45 and the part between the magnet holder 40 and the permanent magnet 15 is filled with the epoxy resin. The permanent magnet 15 is strongly fastened to the magnet holder 40 and they are assembled in one body. This configuration can avoid the occurrence of deformation of the magnet holder 40 of a rectangular prism shape. Because a gap between a large part of the elastic projection 43 and the permanent magnet 15 is large, it is difficult to assemble the elastic projection 43 and the permanent magnet 15 in one body by using epoxy resin, and there is a possibility of deforming the elastic projection 43 in the circumferential direction. By the way, a small amount of the epoxy resin is still remained in the penetrating hole 45.

In FIG. 4, the connecting plate parts 46 can be disposed at the inside in the radial direction when compared with the position of each of the claw poles 123 and 143 because the thickness of the front tip part of each claw pole 123 and 143 has thin in the radial direction, and the front tip part of each claw pole 123 and 143 is adequately separated from the outer circumferential surface of the field coil 13 in the radial direction.

(Bending Step of the Magnet Holder 40 and the Connecting Plate Parts 46)

A description will now be given of a cutting and bending manner for forming the magnet holder 40 and the connecting plate parts 46. All of the magnet holders 40 are connected together in a ring shape through the connecting plate parts 46 so that the magnet holders 40 of a ring shaped connection accommodate the field coil 13. Each of the magnet holders 40 and the connecting plate parts 46 connected in a ring shape is formed by welding non-magnetic stainless plate in a cylindrical shape, and the cylindrical-shaped one is then cut and bent.

MODIFICATIONS

It is preferred to form non-magnetic stainless plate of a belt shape in a cylindrical shape by cutting and bending, and both the end parts of the connecting plate parts 46 are welded together in order to finally produce the magnet holder 40 and the connecting plate parts 46 in a cylindrical shape. In this case, as shown in FIG. 5, although each magnet holder 40 must be slightly slant toward the axial direction, such a slant of each magnet holder 40 can be achieved by forming the connecting plate part 46 in a conical surface with a specified curvature in the radius inside direction. This manner can use non-magnetic stainless plate most efficiently, which is expensive, and can reduce the manufacturing cost of the vehicular alternator.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A vehicular alternator comprising:
a pair of pole cores having a plurality of claw poles of a predetermined number extending an axial direction of the pole cores, and alternately arranged in a circumferential direction of the pole cores at a predetermined pitch;
a field coil wound on a boss part of each pole core;
permanent magnets arranged in a gap between adjacent claw poles in the circumferential direction in order to reduce magnetic leakage of the claw poles;
magnet holders of non-magnetic characteristic, each magnet holder having a rectangular prism shape supported by the adjacent claw poles arranged in the circumferential direction, and each magnet holder accommodating and protecting the permanent magnet by which the permanent magnet is supported between the adjacent two claw poles; and
connecting plate parts through which the magnet holders are connected in a ring shape,
wherein the magnet holders and the connecting plate parts are made of a same non-magnetic metal plate sheet and integrated together,
wherein each connecting plate part extends, in a circumferential direction of the pole cores, from an inner radial surface of each magnet holder,
wherein the connecting plate part is disposed facing a front tip part of the claw pole in the radial direction, and
wherein the magnet holder has elastic projections capable of elastically projecting toward the side surfaces of the adjacent claw poles.

2. The vehicular alternator according to claim 1, wherein each elastic projection is so formed that the surface of the magnet holder facing the claw pole is cut and bent.

3. The vehicular alternator according to claim 2, wherein each elastic projection is composed of a base part and an extending part, wherein the base part is a part of a side surface of each magnet holder facing the claw pole and positioned at the base part of the claw pole, and the extending part extends from the base part along the side surface of the claw pole, and an approximate intermediate part of the extending part is separated from the permanent magnet and bent toward the claw pole.

4. The vehicular alternator according to claim 1, wherein five surfaces other than an inner surface of each magnet holder in the radius direction are made from the non-magnetic plate sheet by cutting and bending.

5. The vehicular alternator according to claim 1, wherein the magnet holder accommodating the permanent magnet has a penetrating hole through which an outer surface of the permanent magnet in the radius direction is exposed through the penetrating hole.

6. The vehicular alternator according to claim 1, wherein an inner radial surface of each magnet holder and the connecting plate parts are integrated together along the circumferential direction of the pole cores.

7. A vehicular alternator comprising:
a pair of pole cores having a plurality of claw poles of a predetermined number extending an axial direction of the pole cores, and alternately arranged in a circumferential direction of the pole cores at a predetermined pitch;
a field coil wound on a boss part of each pole core;
permanent magnets arranged in a gap between adjacent claw poles in the circumferential direction in order to reduce magnetic leakage of the claw poles;
magnet holders of non-magnetic characteristic, each magnet holder having a rectangular prism shape supported by the adjacent claw poles arranged in the circumferential direction, and each magnet holder accommodating and protecting the permanent magnet by which the permanent magnet is supported between the adjacent two claw poles; and
connecting plate parts through which the magnet holders are connected in a ring shape,
wherein the magnet holders and the connecting plate parts are made of a same non-magnetic metal plate sheet and integrated together,
wherein each connecting plate part extends, in a circumferential direction of the pole cores, from an inner radial surface of each magnet holder,
wherein the connecting plate part faces a base part of the claw pole in the radial direction, and
wherein the magnet holder has elastic projections capable of elastically projecting toward the side surfaces of the adjacent claw poles.

8. The vehicular alternator according to claim 7, wherein each elastic projection is so formed that the surface of the magnet holder facing the claw pole is cut and bent.

9. The vehicular alternator according to claim 8, wherein each elastic projection is composed of a base part and an extending part, wherein the base part is a part of a side surface of each magnet holder facing the claw pole and positioned at the base part of the claw pole, and the extending part extends from the base part along the side surface of the claw pole, and an approximate intermediate part of the extending part is separated from the permanent magnet and bent toward the claw pole.

* * * * *